Dec. 18, 1945. M. NIEMI 2,391,185
FISH PICK
Filed Jan. 17, 1944
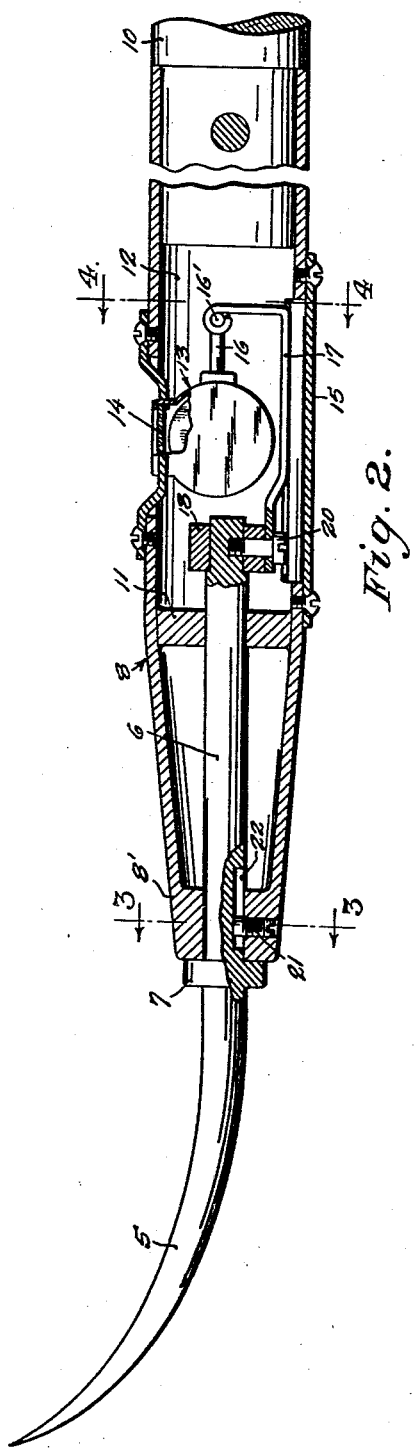
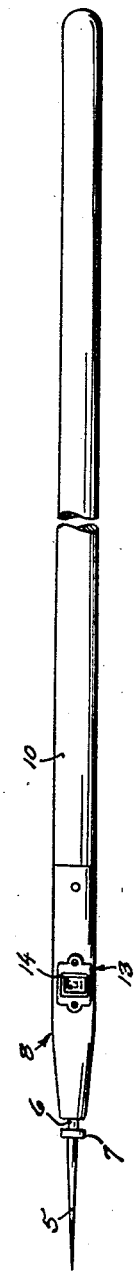
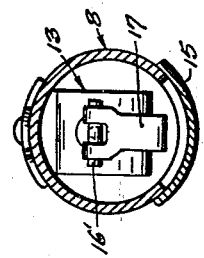
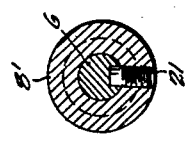
INVENTOR.
Matti Niemi
BY Edward L. Ramo
atty.

UNITED STATES PATENT OFFICE 2,391,185

FISH PICK

Matti Niemi, Anchorage, Territory of Alaska

Application January 17, 1944, Serial No. 518,673

2 Claims. (Cl. 235—91)

This invention relates to a fish pick or, as customarily termed by salmon fishermen, a "fish pew," and which is employed in pitching fish from fishing vessels onto the receiving decks of canneries or into barges or the like to be carried to the latter.

As its general object, the invention aims to provide a pitching pick for the above purpose embodying counter mechanism and which is arranged and adapted to operate automatically by its pitching usage to register the number of fish removed by the pick from the fishing vessel and thus give an accurate check of the vessel's catch.

The invention consists in the novel construction and in the adaptation and combination of parts hereinafter described and claimed.

In the accompanying drawing:

Figure 1 is a top plan view portraying a fish pick constructed in accordance with the present invention and illustrating the pick proper in the position occupied by the same following a pitching operation.

Fig. 2 is a fragmentary longitudinal vertical sectional view of the pick detailing the operating mechanism and indicating the parts in the positions which the same assume upon the act of impaling a fish, the view being taken to an enlarged scale and having parts shown in elevation; and Figs. 3 and 4 are transverse vertical sections on respective lines 3—3 and 4—4 of Fig. 2.

According to the present invention, there is provided a single sharply pointed tine 5 of the usual curved form customarily associated with hay-forks and other pitching tools and having a shank 6 produced as a rectilineal prolongation thereof and which is separated from the tine by a flange 7.

Denoted by 8 is a stock-piece supported upon the end of a tool-handle 10, and which is designed to give much the appearance of an ordinary ferrule with a socket being provided at one end thereof for the reception of the handle and at the other end being tapered and terminating in a center-bored boss-head 8'. There is described within this stock-piece—between the butt end of the socketed handle and a fixed reinforcing ring 11—a chamber 12. The shank 6 of said pick is given a slide journal in the center-bored head and projects through the center aperture of the ring into such chamber, and also received in the chamber to occupy a position above the inserted end of the shank is a counter 13. The counter is of the usual construction providing a set of numbered wheels interconnected to perform the successive advance of the numbers of a higher order by a complete revolution of the wheel of the next lower order, with means being provided for turning the numbers to zero at the commencement of a counting operation, and having a window, as 14, through which the count may be observed, and to give access to the chamber for operation of such turn-back means I provide an inspection plate 15. Of the presently marketed counters applicable to the present invention, the one which I have elected to show without, however, implying any limitations thereby is of that character wherein a reciprocatively mounted stem acts by its depressive movement to perform the unit-count office, returning by the force of a spring acting in opposition to the depression action to a normal inactive position. This said stem is designated by 16 and is shown as being provided with a cross-arm 16', and as an operative interconnection from the said shank 6 to this cross-arm I employ an L-shaped finger 17 carried upwardly from a collar 18 which is fixed by a cap-screw 20 to the shank. Said collar, as with the flange 7, serves a stop office limiting the sliding travel of the pick, and to secure the latter against rotary movement I employ a screw 21 working in a keyway 22 of the shank.

The device is used in substantially the same manner as the customary fish pick, namely by impaling a fish on the tine and by an upward swinging motion tossing the same onto the receiving deck, the weight of the fish under pitching momentum freeing the pick from the impaled fish. It is this force of momentum on which I rely to give a limited forward motion to the shank of the pick and, through the connecting finger 17, actuate the counter through a unit advance by the responsive depression of the operating stem 16. As the operator then applies the pick to impale another fish, the stop flange 7 is again forced back into abutting engagement with the head of the stock-piece, giving corresponding retractive movement to the counter stem, and the counter registers another fish as the operation is repeated. It will be understood that the action of pitching an impaled fish and then impaling another fish is self-sufficient to accomplish a reciprocatory cycle of the operating stem of the counter, and that a return spring such as is found in the plunger type of counter illustrated therefor becomes unnecessary to the counting action. In point of fact, this spring, in and of itself and as usually applied to a counter, is not sufficiently strong to retract the pick but I find that it is a desirable adjunct in that it tends to preclude any free play of the shank in the latter's slide journal.

The invention is believed to be clear from the foregoing description. It is to be understood that various departures from the illustrated and described embodiment may be resorted to without departing from the spirit of the invention, and in this connection it is to be expressly pointed out that a modification which might, perhaps, find favor is one applying a comparatively strong spring to work in opposition to the pitch-influenced forward urge of the pick, a spring, more especially, which would be overpowered by the force moment of a pitching action but which would have sufficient force to thereupon retract the pick without the necessity of relying upon a following impaling action. While less desirable, it is also feasible to reverse the order of the counter's action, and which is to say accomplish a counting impulse when impaling and have the pitching action perform the office of returning the parts to normalcy.

What I claim is:

1. A fish-pick for the described purpose comprising, in combination: a handle provided upon its lower end with a stock-piece, said stock-piece being hollow to describe a chamber therein and having a center-bore in the nose giving access to said chamber; a fish-impaling tine having a curved outer end and produced with an integral shank journaled for reciprocatory slide action in said center-bore of the stock-piece to have the inner end of the shank project into the chamber; a counting device housed in said chamber to occupy a position axially removed above the shank's inner end, and providing a reciprocatively mounted actuating stem movable on a slide axis paralleling that of the shank, said stem serving to activate the counting mechanism of the counting device through a one-number advance by movement in one direction of reciprocation while being inactive to said counting mechanism in the return travel of reciprocation; and connection from said inner end of the shank to the stem operating by outward sliding movement of the tine to activate the stem in the latter's said counting stroke and by inward sliding movement of the tine to activate the stem in the latter's said return stroke.

2. A fish-pick according to claim 1 wherein, to relieve the counting mechanism of shock stresses, stop means engageable with the stock-piece and limiting the sliding travel of the tine's shank in both directions of reciprocation are provided upon the shank.

MATTI NIEMI.